(12) United States Patent
Vasko et al.

(10) Patent No.: US 9,798,319 B2
(45) Date of Patent: Oct. 24, 2017

(54) INDUSTRIAL CONTROL METADATA ENGINE

(75) Inventors: David A. Vasko, Solon, OH (US); Raymond J. Staron, Chagrin Falls, OH (US); Charles Martin Rischar, Chardon, OH (US); Kenwood H. Hall, Hudson, OH (US); Subbian Govindaraj, Solon, OH (US); Robert J. Kretschmann, Bay Village, OH (US); Michael D. Kalan, Highland Heights, OH (US); Paul R. D'Mura, Glendale, AZ (US); Taryl J. Jasper, South Euclid, OH (US); Eugene Liberman, Rocky River, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 1004 days.

(21) Appl. No.: 12/127,598

(22) Filed: May 27, 2008

(65) Prior Publication Data

US 2009/0300021 A1 Dec. 3, 2009

(51) Int. Cl.
*G06F 17/30* (2006.01)
*G05B 19/418* (2006.01)
*G06F 7/00* (2006.01)

(52) U.S. Cl.
CPC ............ *G05B 19/41845* (2013.01); *G05B 2219/31134* (2013.01); *Y02P 90/16* (2015.11)

(58) Field of Classification Search
CPC .............. G06F 17/30289; G06F 17/30722
USPC .............. 707/636, 803, 781; 370/389
See application file for complete search history.

(56) References Cited

U.S. PATENT DOCUMENTS

| | | | |
|---|---|---|---|
| 6,343,287 B1 * | 1/2002 | Kumar et al. | |
| 6,427,140 B1 | 7/2002 | Ginter et al. | |
| 7,123,974 B1 * | 10/2006 | Hamilton | 700/87 |
| 7,334,130 B2 | 2/2008 | Bowers | |
| 8,156,297 B2 * | 4/2012 | Geiger et al. | 711/163 |
| 8,260,783 B2 * | 9/2012 | Milam | 707/741 |
| 9,141,658 B1 * | 9/2015 | Nair | G06F 17/30345 |
| 2001/0044737 A1 * | 11/2001 | Halligan | G06Q 10/063 705/50 |
| 2001/0044854 A1 * | 11/2001 | Frary | 709/310 |
| 2003/0135507 A1 * | 7/2003 | Hind et al. | 707/100 |
| 2005/0209897 A1 * | 9/2005 | Luhr | 705/7 |
| 2005/0283751 A1 * | 12/2005 | Bassin et al. | 717/100 |
| 2006/0026193 A1 * | 2/2006 | Hood | 707/102 |
| 2006/0075066 A1 * | 4/2006 | Farchmin et al. | 709/217 |
| 2007/0019641 A1 * | 1/2007 | Pai et al. | 370/389 |
| 2007/0050777 A1 * | 3/2007 | Hutchinson et al. | 718/104 |
| 2007/0078537 A1 * | 4/2007 | Chand et al. | 700/83 |

(Continued)

*Primary Examiner* — Kuen Lu
(74) *Attorney, Agent, or Firm* — Amin, Turocy & Watson, LLP

(57) ABSTRACT

In an industrial control setting, different components can have information that can be valuable to various entities, such as other components, technicians, and the like. A decision can be made as to what information should be available to entities and a determination can be made if the information should be published in a directory or be discoverable. Security can be taken into account in determining if information should be published and decision making can employ adaptive learning, such that a publish and/or discovery decision criterion can be modified based on the learning.

20 Claims, 10 Drawing Sheets

(56) References Cited

U.S. PATENT DOCUMENTS

| | | | |
|---|---|---|---|
| 2007/0094181 A1* | 4/2007 | Tayebnejad | G06Q 40/08 706/21 |
| 2007/0112801 A1* | 5/2007 | McGreevy et al. | 707/100 |
| 2007/0174247 A1* | 7/2007 | Xu | G06F 17/30722 |
| 2007/0203912 A1* | 8/2007 | Thuve et al. | 707/10 |
| 2008/0005778 A1* | 1/2008 | Chen et al. | 726/1 |
| 2008/0079558 A1 | 4/2008 | Dorgelo et al. | |
| 2008/0082185 A1 | 4/2008 | Hood et al. | |
| 2008/0125887 A1 | 5/2008 | Case | |
| 2009/0313256 A1* | 12/2009 | Konduri | G06F 17/30864 |
| 2010/0114634 A1* | 5/2010 | Christiansen | G06Q 10/06 705/7.28 |
| 2010/0292825 A1* | 11/2010 | Taylor | C25C 3/06 700/108 |
| 2013/0013347 A1* | 1/2013 | Ling et al. | 705/4 |

* cited by examiner

INDUSTRIAL CONTROL METADATA ENGINE

TECHNICAL FIELD

The subject specification relates generally to industrial control directories and in particular to automatically publishing information into the directory.

BACKGROUND

Industrial control environments can typically involve complex mechanical, electronic, electromechanical, and/or robotic machinery that perform various automated mechanical and/or electrical functions. Such machinery can include industrial motors, pumps, conveyors, escalators, drills, refrigeration systems, and so on, that can provide a particular physical output. Typically, an industrial environment utilizes one or more control devices to determine when to activate or deactivate such machinery, as well as an appropriate level of activation, (e.g., an amount of current to supply a variable input motor). Additionally, the control devices are associated with logical program code that can determine an appropriate time, degree, manner, etc., to operate such machinery based on various determinable circumstances (e.g., output of another device, reading of an optical sensor, electronic measurement such as current level in a device, movement or number of rotations of a device, and so on).

Different controls can be used to provide protective features in an industrial environment. If a user attempts to make a change upon the industrial environment, then various checks can take place to discover if a user is authorized to make the change, such as requesting the user to enter a username and password. In addition, the user can be provided various tools that can assist in making changes to the industrial environment, including providing a template to be used to make different modifications.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Individual modules of an industrial control configuration can retain information that can be beneficial to other entities. In order to share the retained information with the entities, the information can be published in a directory, location of the information can be posted in the directory and/or the information can be made available to requesting entities. Metadata (e.g., information that pertains to an industrial control module entity) can be analyzed and based upon the analysis a decision can be made on if the information should be disclosed as well as a manner in which to disclose the information (e.g., publishing, allow for discovery, etc.).

In addition, an entity can desire to perform a change to available metadata. A check can be performed on a proposed change and a determination can be made if the change should be implemented. As metadata becomes available, adaptive learning can take place based on how the metadata is used, accessed, and the like. A determination can be made; for example if a selection policy should be altered, if particular metadata is in a dangerous situation (e.g., has a relatively high likelihood of being accessed by an undesirable entity), and the like.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
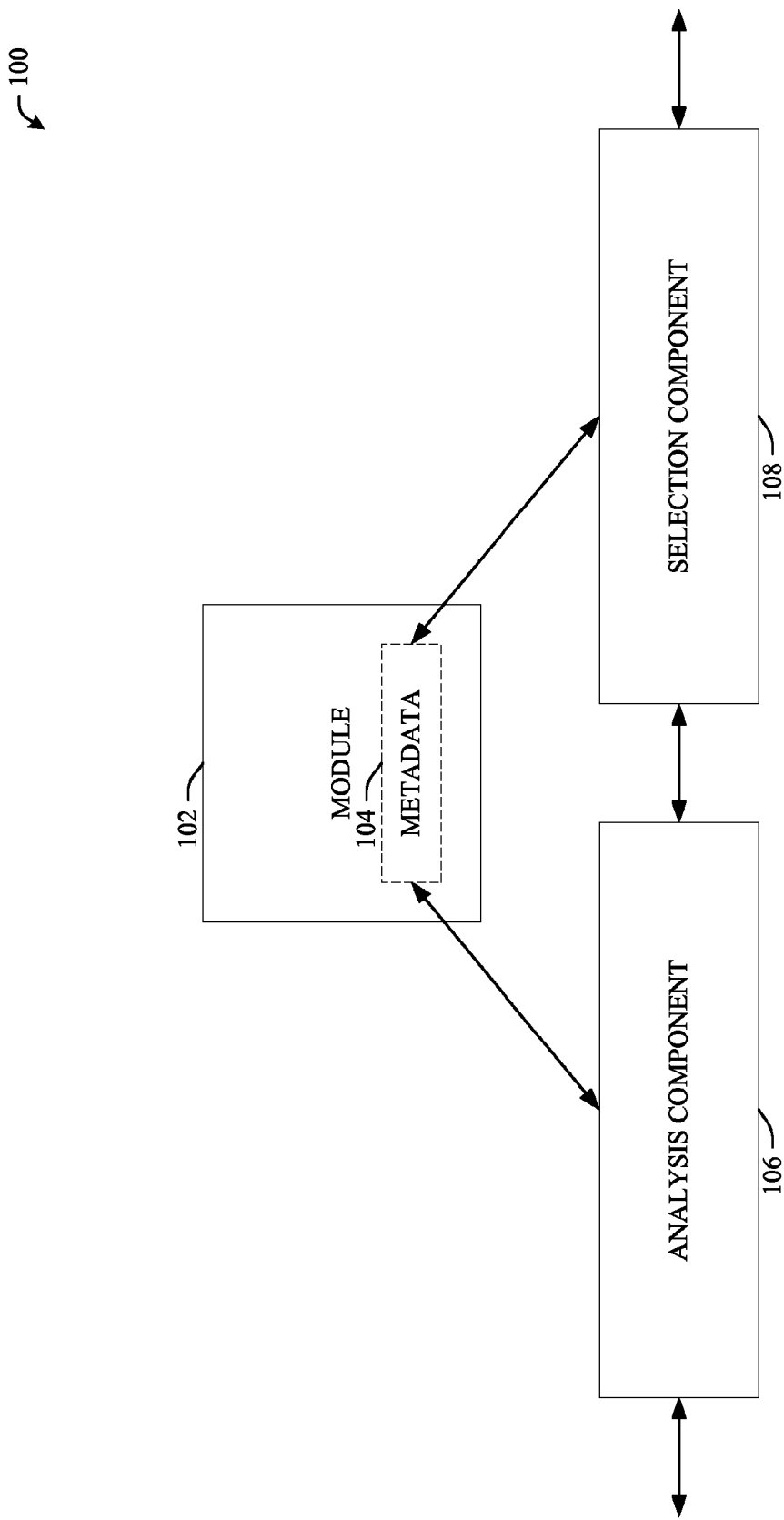
FIG. 1 illustrates a representative system for making information available with relation to an industrial control configuration in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic; that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. It is to be appreciated that determinations or inferences referenced throughout the subject specification can be practiced through use of artificial intelligence techniques.

Now referring to FIG. 1, an example system 100 is disclosed for enabling information to be disclosed to entities of an industrial control configuration—commonly through publication in a directory or through allowing the information to be discoverable. An industrial control environment can include a number of modules, such as an example module 102 (e.g., industrial controller). The module 102 can include metadata 104 that can be of benefit to other modules, such as services offered, dependencies of the module 102, and the like. Commonly, the metadata 104 can include at least one service of the module 102, at least one capability of the module 102, at least one relationship of the module 102 with an entity (e.g., industrial controller), at least one dependency of the module 102, or a combination thereof. Metadata can also be a description of a module, aspects of the module, and the like.

An analysis component 106 can evaluate metadata 104 of the module 102 of an industrial control configuration. Metadata can be discovered and classified into different categories, such as services, capabilities, dependencies, and the like. Categories of the metadata 104 can be evaluated, which can include estimating how valuable the metadata can be to other modules, likely damage if there is a break in security, and the like. However, other configuration can be practiced, such as evaluating pieces of metadata individually.

A selection component 108 can choose at least a portion of the metadata 104 for disclosure (e.g., none of the metadata, a portion of the metadata, all of the metadata, and the like), where the choice is commonly made as a function of a result of the metadata evaluation. Commonly, metadata selection is performed automatically; however, a user can manually select metadata, where the selection is processed by the selection component 108 such that the user selections are chosen. Complex balancing can occur to determine if and what metadata should be disclosed. For instance, a need of other entities can be balanced against reliability of the metadata 104. If at least a portion of the metadata 104 is selected for disclosure, then a determination can be made on if the metadata should be placed in a directory, made discoverable, as well as other disclosure manners.

The system 100 can implement in other arrangements than what is disclosed in FIG. 1. For example, the analysis component 106 and/or the selection component 108 can reside upon the module 102—operation can occur specifically for the module 102 and/or for other modules of the industrial control configuration. In addition, the analysis component 106 and/or the selection component 108 can function as an independent device of the industrial control configuration, including a device that can be removable.

Figure 2:
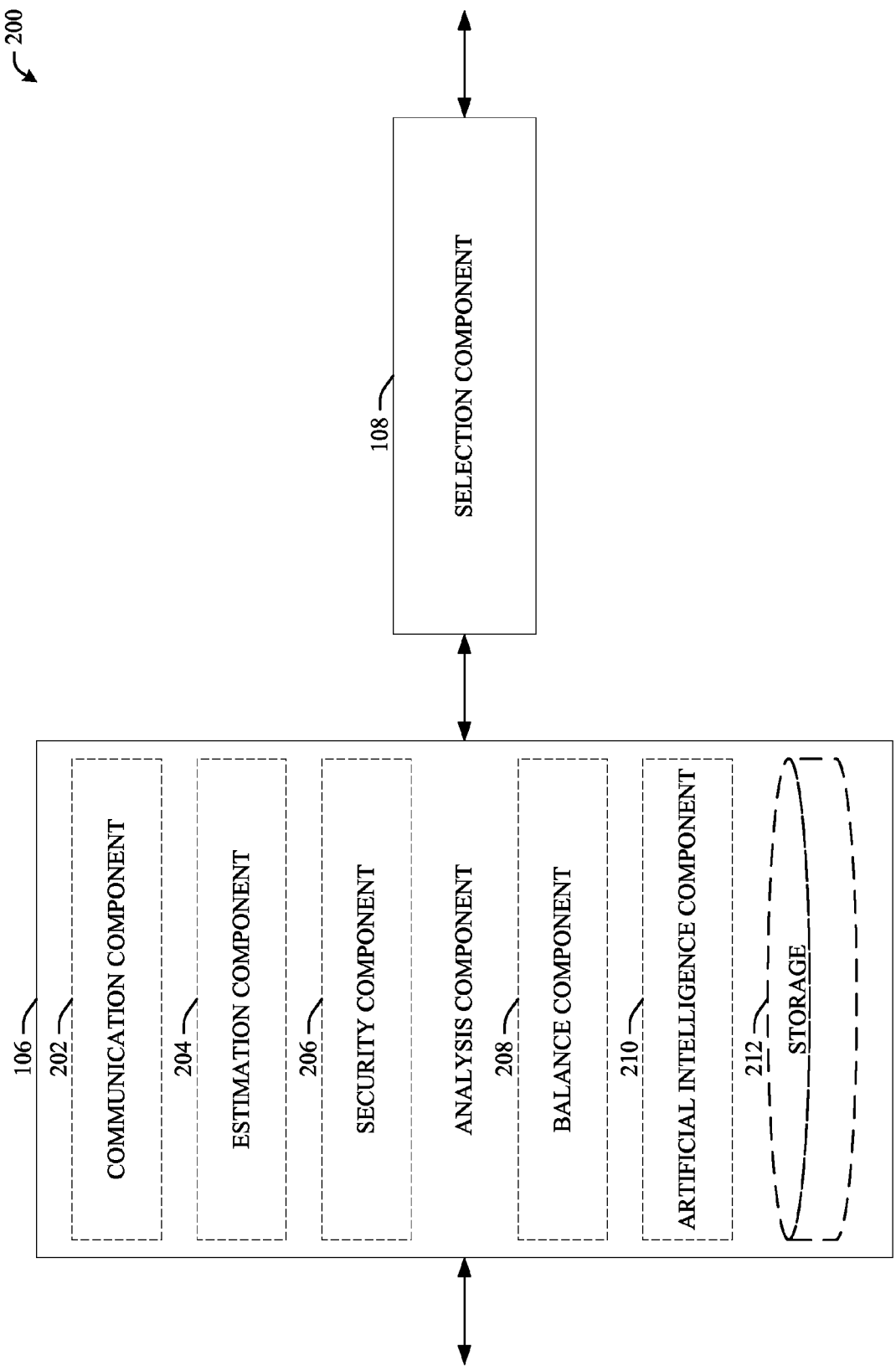
FIG. 2 illustrates a representative system for making information available with relation to an industrial control configuration with a detailed analysis component in accordance with an aspect of the subject specification.

Now referring to FIG. 2, an example system 200 is disclosed for determining if metadata 104 of FIG. 1 of a module 102 of FIG. 1 should be disclosed with a detailed analysis component 106. The analysis component 106 can evaluate the metadata 104 of FIG. 1 in a manner consistent with determining if the metadata 104 of FIG. 1 should be disclosed to another entity of an industrial control configuration. A communication component 202 can engage with other devices to transfer information, such as to send a request for operational history of the module 102, receiving information from an auxiliary source, etc. Operation can take place wirelessly, in a hard-wired manner, employment of security technology (e.g., encryption), etc. Information transfer can be active (e.g., query/response, product/consumer, etc.) or passive (e.g., monitoring of communication signals). Moreover, the communication component 202 can utilize various protective features, such as performing a virus scan on collected data and blocking information that is positive for a virus.

An estimation component 204 can predict how likely metadata is to be of value to another entity. It is possible that so much metadata is made available that it can hamper system performance. For example, if all metadata is made available, then other modules can dedicate valuable resources locating particular metadata. In addition to filtering metadata, the estimation component 204 can identify highly important metadata that other entities are likely to find important. Ratings can be provided for metadata based upon a likelihood of importance to an entity.

A security component 206 can determine if at least a portion of the metadata should be made available as a function of risk associated with the metadata 104 of FIG. 1. In an illustrative example, potential metadata for disclosure can include trade secret information (e.g., a formula used in mixing a product). If there is potential that third party devices can enter an industrial control system with the metadata, then it can be deemed a high security risk to make the trade secret information available. Therefore, the security component 206 can determine that the trade secret information should not be disclosed. The security component 206 can also operate to supply ratings—as opposed to determining if information should be made available on an absolute scale (e.g., yes or no), a security rating can be provided (e.g., high/medium/low risk rating, numerical score, etc.).

A balance component 208 can weigh different factors to assist in determining if metadata should be disclosed. Commonly, weighing can be comparing numerical scores of value, security, and the like. According to one embodiment, operation of components of the subject specification can be altered based upon learned history. For example, if a class of metadata is often searched by entities, then the estimation component 204 can increase a value rating for that class.

An artificial intelligence component 210 can perform at least one inference or at least one determination that concerns evaluating the metadata 104 of FIG. 1 or selecting if a portion of the metadata 104 of FIG. 1 should disclosed as well as what portion should be disclosed. The artificial intelligence component 210 can employ one of numerous methodologies for learning from data and then drawing inferences and/or making determinations related to applying a service (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems.

Different pieces of information, such as collected materials, component operating instructions (e.g., of the communication component 202), source location, components themselves, etc. can be held on storage 212. Storage 212 can arrange in a number of different configurations, including as random access memory, battery-backed memory, hard disk, magnetic tape, etc. Various features can be implemented upon storage 212, such as compression and automatic back up (e.g., use of a Redundant Array of Independent Drives configuration). The estimation component 204 can employ, as example time value trimming techniques such that metadata is evaluated as to how much and how long it should be kept or made available from storage component 212. As time progresses, metadata not requested by other entities can be progressively trimmed, to maintain or improve system performance. A selection component 108 can choose at least a portion of the metadata for disclosure, where the choice can be made as a function of a result of the metadata evaluation.

Figure 3:
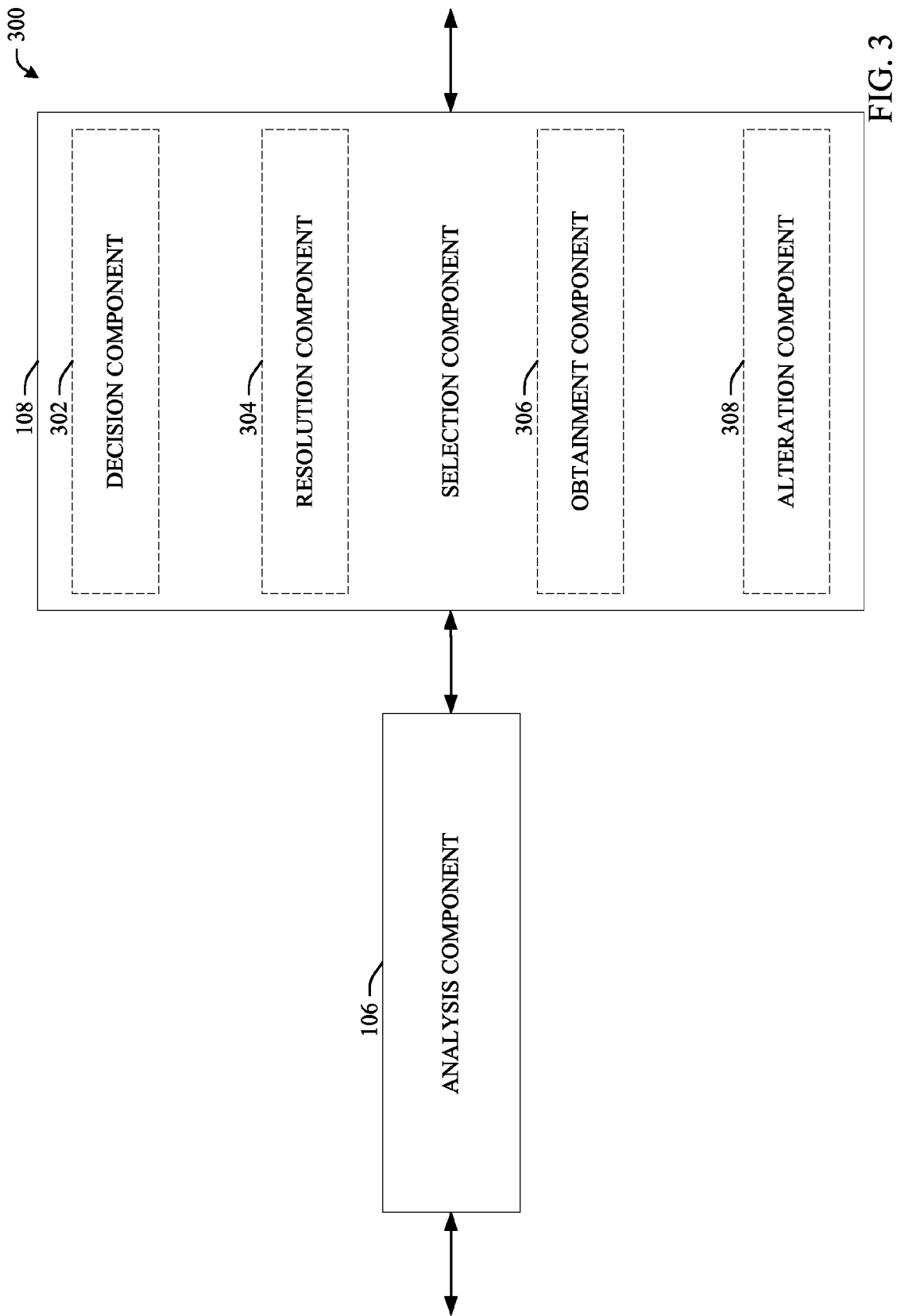
FIG. 3 illustrates a representative system for making information available with relation to an industrial control configuration with a detailed selection component in accordance with an aspect of the subject specification.

Now referring to FIG. 3, an example system 300 is disclosed for determining if metadata 104 of FIG. 1 of a module 102 of FIG. 1 should be disclosed with a detailed selection component 108. An analysis component 106 can evaluate metadata of a module of the industrial control configuration. The selection component 108 can choose at least a portion of the metadata for disclosure, where the choice can be made as a function of a result of the metadata evaluation.

A decision component 302 can determine if a portion of metadata 104 of FIG. 1 should be disclosed based upon an output of the estimation component 204 of FIG. 2, the security component 206 of FIG. 2, the balance component 208 of FIG. 2, etc. According to one embodiment, different evaluation of metadata can produce different results and the decision component 302 can factor these different results in making a determination, including a result of balancing. However, other features can be used; for example, the security component 206 of FIG. 2 can have an absolute power, where if a portion of metadata is considered a high enough security risk, then the security component 206 of FIG. 2 can block the metadata from disclosure regardless of how beneficial it is to an entity. Through use of the decision component 302, the choice can be made based upon a likelihood of an entity of the industrial control system requesting the metadata, a security characteristic of the metadata, volatility of the metadata, or a combination thereof.

Various implementations can take place upon how selected metadata can be disclosed. Therefore, a resolution component 304 can decide if selected metadata should be published or if the selected metadata should be discoverable (e.g., publish the metadata and allow metadata to be discoverable), as well as other implementations. The decision can be made automatically based upon a firm rule set or based upon analysis of contextual characteristics. For instance, different modules of an industrial control configuration can have an allotted amount of metadata that can be placed in a directory. If a module meets its quota for the directory and selected metadata is not very important and/or commonly used, then the resolution component 304 can determine that the selected metadata should be discoverable; an outcome of operation of the resolution component 304 can ultimately be implemented.

Since modules of the industrial control system can view metadata, these modules can have a desire to change the metadata. For example a technician can access the module and appreciate that the module has a dependency with a first controller. The technician can desire to alter operation of the first controller and suggest that the module change the dependency from the first controller to the second controller while the alteration is made. An obtainment component 306 can collect a modification suggestion in relation to the metadata. The selection component 108 can determine if the modification suggestion should be implemented and an alteration component 308 can change the metadata based upon the collected modification suggestion.

Figure 4:
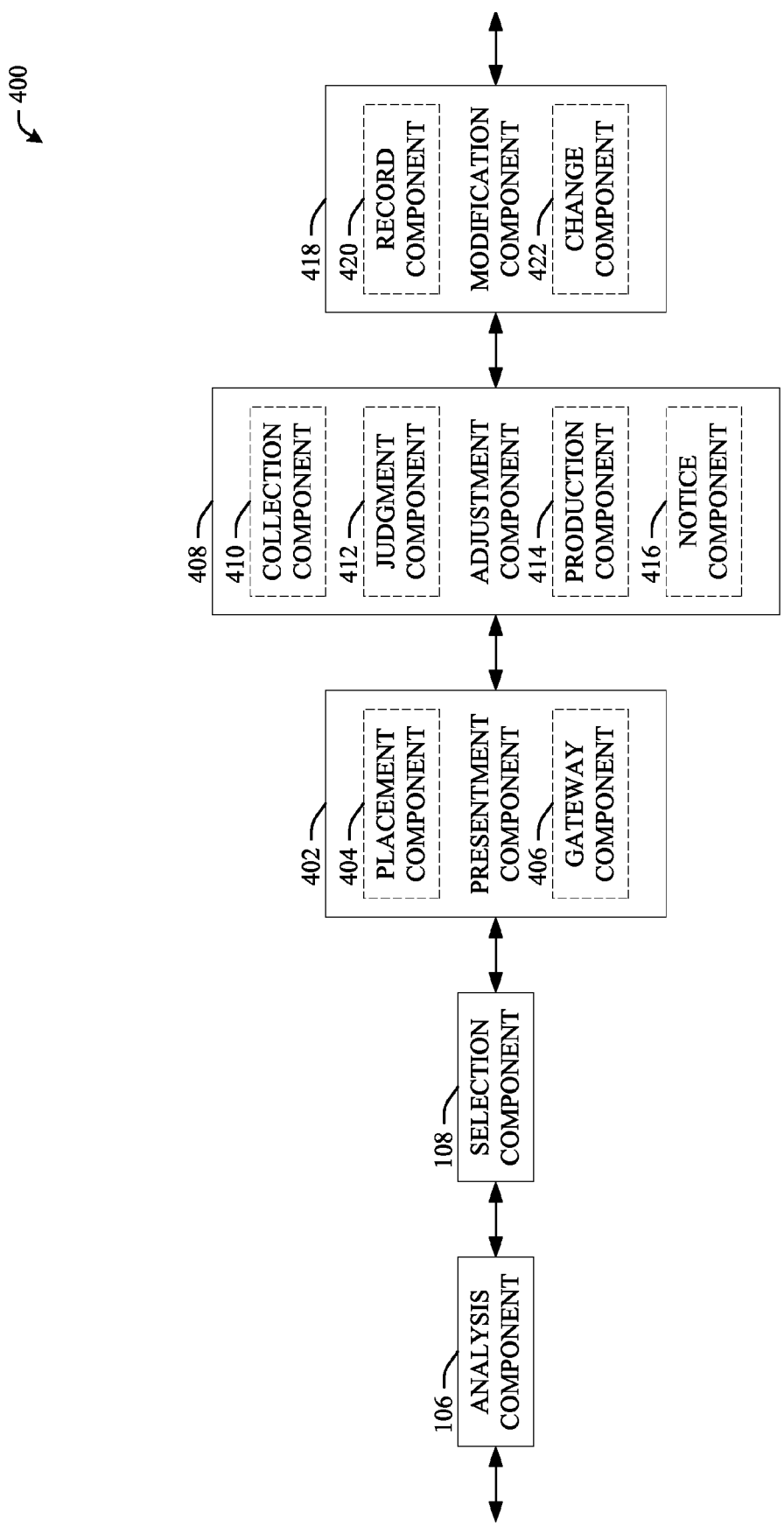
FIG. 4 illustrates a representative system for making information available with relation to an industrial control configuration and making an appropriate modification in accordance with an aspect of the subject specification.

Now referring to FIG. 4, an example system 400 is disclosed for actively altering operation in regard to metadata of an industrial control configuration. An analysis component 106 can evaluate metadata 104 of FIG. 1 of a module 102 of FIG. 1 of the industrial control configuration. Then a selection component 108 can choose at least a portion of the metadata for disclosure, the choice is made as a function of a result of the metadata evaluation. The selection component 108 can operate as means for selecting intelligently and automatically metadata for availability to an entity of the industrial control configuration.

A presentment component 402 can determine a manner in which to disclose the selected metadata. The presentment component 402 can use a placement component 404 to populate at least a portion of the chosen metadata upon a directory of the industrial control configuration (e.g., in the industrial control configuration); according to one embodiment, the directory is a distributed directory. Placing the metadata in the directory can allow for other modules of the industrial control configuration to learn about the module. The metadata placed in the directory can be desirable information as well as directions on how to reach desirable information. In addition, a gateway component 406 can enable the chosen metadata to be discoverable (e.g., other modules can locate the metadata 104 of FIG. 1 by performing a search upon the module 102). Both the placement component 404 and gateway component 406 can work in conjunction, such that metadata is both discoverable and placed into an appropriate directory.

Various entities of an industrial control configuration can desire to make changes related to the metadata (e.g., change the metadata, make a change based on information learned from the metadata, and the like). An adjustment component 408 (e.g., can share functionality with the alteration component 308 of FIG. 3) can be used that changes the metadata based upon a collected modification suggestion, where the suggestion is collected through a collection component 410. The collection component 410 can configure as means for collecting a suggested change to the metadata.

A judgment component 412 can be used to determine if a suggested change should be implemented. The judgment component 412 can operate as means for determining if the suggested change should be implemented. If it is determined that the suggested change should take place, then a production component 414 can implement the change. Therefore, the production component 414 can operate as means for implementing the suggested change based upon a positive determination. If is determined that the change should not take place, that the change should occur in a different manner than suggested, and the like, then a notice component 416 can be used to inform the requesting entity that the change did not occur. A produced notice can include why a change was not accepted, a change that does take place if the change is different than a suggestion, and the like.

The system 400 (and related components) can adaptively learn based on observed history through use of a modification component 418. For instance, if certain metadata is commonly searched, then rules of the presentment component 402 can be altered such that the metadata is changed from being discoverable to be placed into a directory. Additionally, the modification component 418 can alter available metadata based upon a user manual override. Thus, the modification component 418 can function as means for enabling a user to override the automatically selected metadata manually. For example, the collection component 410 can obtain a user request and the modification component 418 can verify the request and implement the request. A record component 420 can retain history of observation for the industrial control configuration, specifically relating to the selected metadata. The record component 420 can operate as means for recording information related to historical access of the available metadata. The modification component 418 can analyze the history and determine if a change to operation should be made (e.g., how metadata is selected, how weight factors are taken into account, etc.). If it is determined that an alteration should occur, then the alteration can be implemented by a change component 422. The change component 422 can function as means for altering the means for intelligently and automatically selecting metadata based upon the recorded information.

Figure 5:
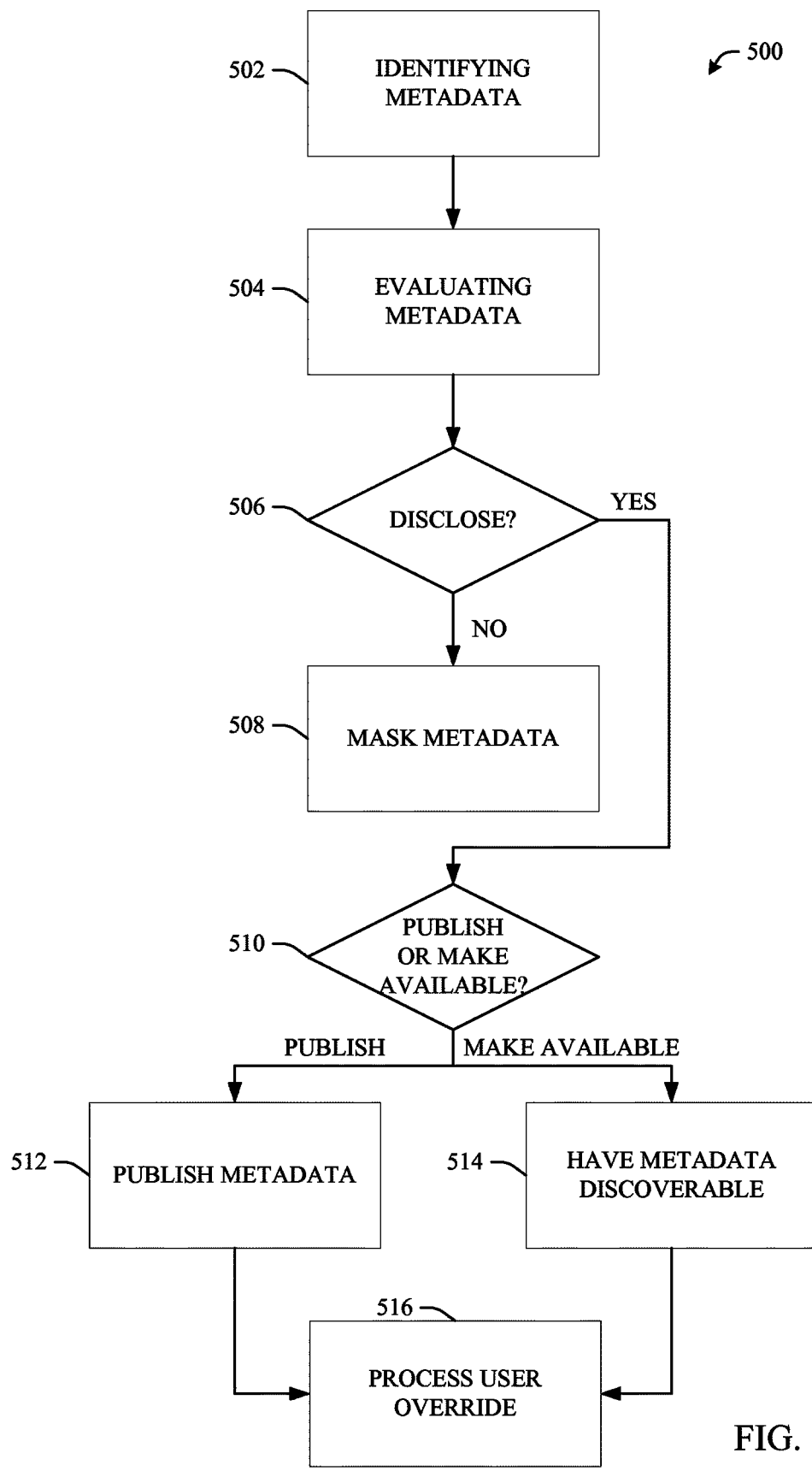
FIG. 5 illustrates a representative methodology for determining if metadata should be disclosed in accordance with an aspect of the subject specification.

Now referring to FIG. 5, an example methodology 500 is disclosed for potentially having metadata disclosed to an entity of an industrial control configuration. Various metadata of a module can be identified at action 502. For example, a periodic scan can occur upon a module, where the scan functions to identify metadata. However, other configurations can be practiced, such as keeping a log of metadata and identifying a change.

Identified metadata can be evaluated through event 504. It is possible that there is a massive amount of metadata and evaluating all the metadata can become cumbersome and a waste of resources. Therefore, selective evaluation can occur, where metadata that is identified as new, likely to change, and the like is evaluated while other metadata is not processed. The metadata can be evaluated with regard to security concern, likelihood of changing, anticipated value to another entity, and the like.

A check 506 can occur to determine if at least a portion of the selected metadata should be disclosed to at least one other entity based upon a result of the evaluation. Commonly, the check 506 can compare different metrics against one another (e.g., security against need) and make a determination based upon the comparison. If it is determined that metadata should not be disclosed (e.g., all the metadata, a portion of the metadata, etc.), then the non-disclosure metadata can be masked at action 508. Masking the metadata prevents the metadata from being discovered upon a search. Other protective features can be implemented, such as requiring a password in order to view the masked metadata.

If it is determined that at least a portion of the metadata should be disclosed, then another check 510 can occur to determine how the metadata should be disclosed—in one example through publication or through allowing the metadata to be discoverable. Different metrics can be used to determine how metadata should be disclosed and multiple manners of disclosure can be practiced (e.g., publishing and allowing for discoverability). The metadata can be published through act 512 that can include organized placement within a directory. Additionally, through action 514, the metadata can be discoverable by searching entities. According to one embodiment, certain types of entities can discover the metadata while others are blocked. For example, third-party devices (e.g., from outside vendors) can have the information blocked while original components can have access. A user can determine that metadata is incorrect with regard to availability (e.g., available when metadata should not be, masked metadata should be available, and the like). An override request can be transferred and processed through event 516. If a user request is authorized and/or authenticated, then an appropriate modification can be made.

Figure 6:
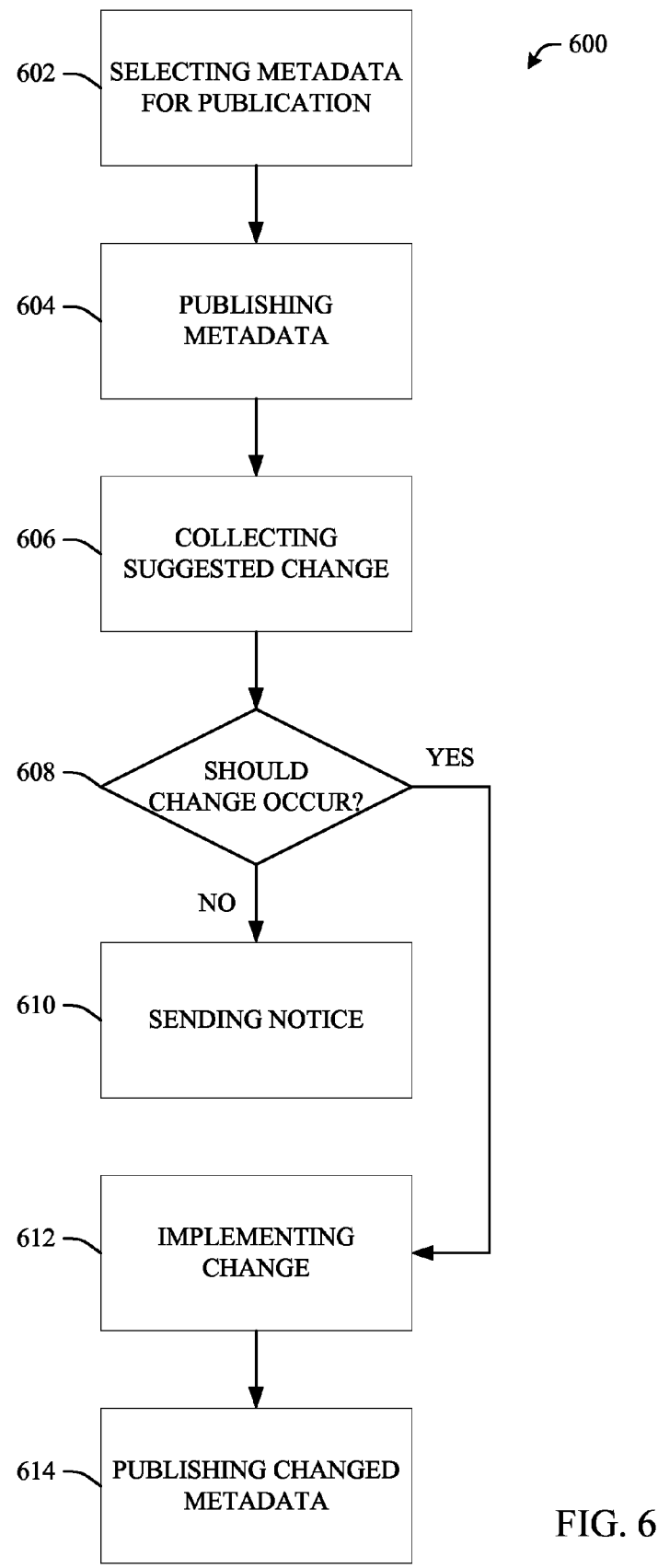
FIG. 6 illustrates a representative methodology for publishing metadata in accordance with an aspect of the subject specification.

Now referring to FIG. 6, an example methodology 600 is disclosed for allowing metadata to be modified. At least a portion of metadata can be selected for publication at action 602. Commonly selection can take place based on a number of factors, including how likely the metadata is to change (e.g., metadata that actively changes and could be deemed too volatile for publication and be designated for discoverability). Therefore, there can be intelligently and automatically selecting metadata (e.g., information, directions to a location of information, an address of information, and the like) for publication upon a directory of an industrial control configuration. At event 604, there can be publishing the selected metadata upon the directory.

Suggested changes can be collected at act 606. In an illustrative example, several controllers can be running similar operations. All but one of the controllers have relatively consistent data, while an outlier controller has substantially inconsistent data. The other controllers can suggest to the outlier controller that the data is incorrect and should be modified.

A check 608 can determine if a proposed change should occur. If the change should not occur, then a notice can transfer to a requesting entity at event 610. The notice can be direct (e.g., specifying why a change should not occur) as well as general (e.g., stating the change is not occurring without specifying a reason). While the methodology 600 discloses sending a notice, it is to be appreciated that a requesting entity can be transferred without notice.

However, if the change is to take place, then the change can be implemented at action 612. Implementing the change can occur in different manners. The metadata can simply be changed as well as operation of a component, process, etc. that produces the metadata. In addition to collecting the suggested change at act 606, there can also be collecting on advice to bring about the desired change. Returning to the example of a group of controllers with an outlier controller, a consistent controller can send code that produces a desirable result when implemented upon the outlier controller. The metadata that results from the change can be published in the directory through action 614. While being disclosed in relation to publishing information, it is to be appreciated that these aspects can be practiced regarding allowing information to be discoverable as well as through other configurations.

Figure 7:
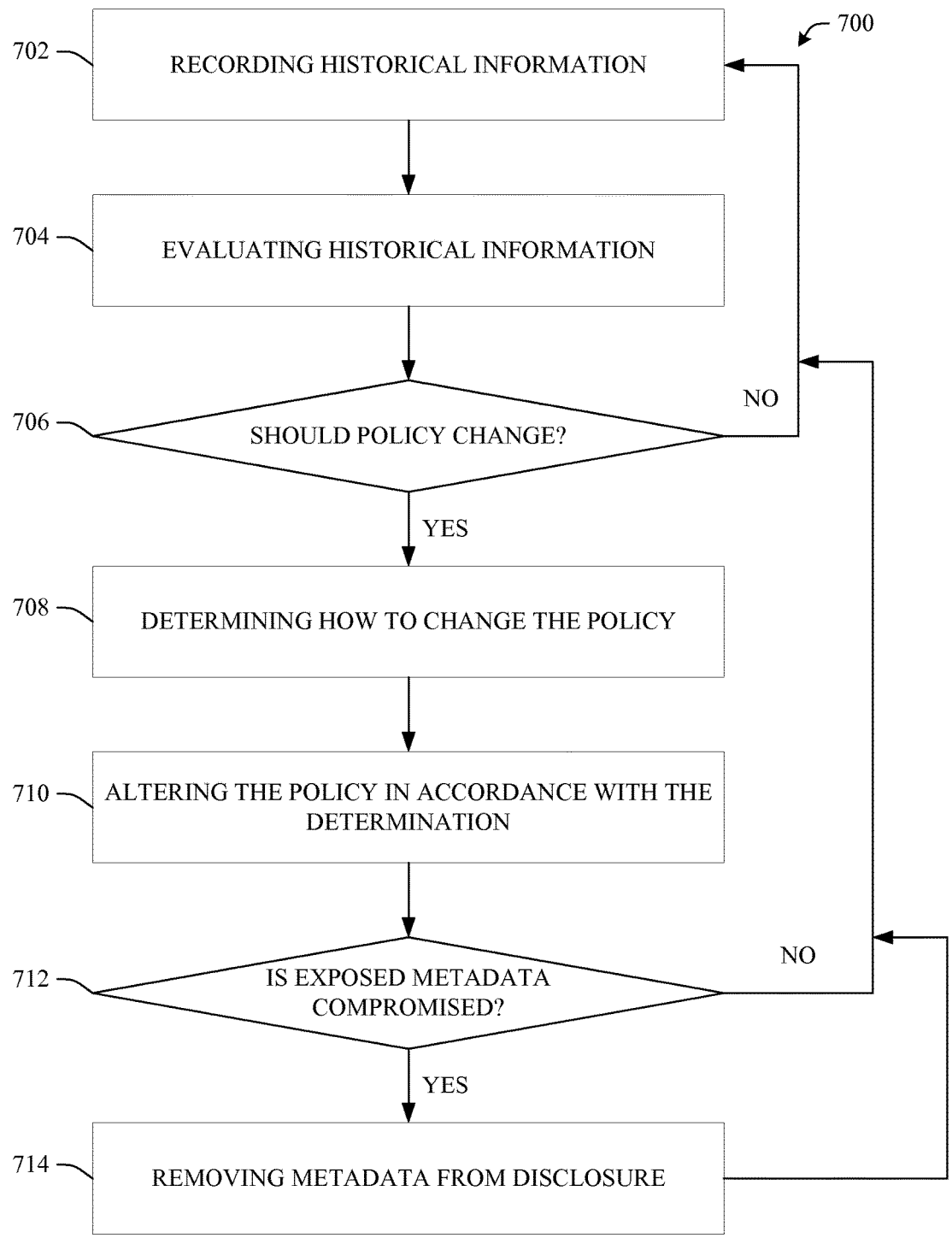
FIG. 7 illustrates a representative methodology for altering operation in disclosing metadata in accordance with an aspect of the subject specification.

Now referring to FIG. 7, an example methodology 700 is disclosed for modifying operation with regard to determining if metadata disclosure should be altered. Historical information related to metadata can be recorded at action 702. Example information which can be recorded can include requests for metadata, identification information of entities that access metadata, failure rates associated with metadata requests (e.g., many components fail when making a request for metadata that is not disclosed).

The recorded historical information can be evaluated at event 704. The evaluation can be continuous (e.g., as new data is recorded another evaluation occurs), at timed intervals, randomly, etc. A check 706 can occur on if policies for disclosing metadata should be changed (e.g., selecting metadata, determining a manner for disclosing metadata, etc.). If the policy should not change, then the methodology 700 can continue recording historical information at action 702.

However, if a policy should be changed, then a determination can take place on how to change the policy at action 708. Various tests can occur to determine a best manner in which to alter the policy, such as through running predictive models. Once an appropriate modification is determined, then the policy can be altered at act 710 in accordance with the determination. While not shown, it is possible for no appropriate alteration to be found and thus the methodology 700 can return to recording historical information.

A check 712 can take place to determine if exposed metadata is compromised. When initially published, sensitivity of metadata can be difficult to determine. An entity can determine that metadata is disclosed that should not be disclosed, metadata can become corrupted, and the like. If it is determined that the metadata is compromised, then the metadata can be removed from disclosure (e.g., taken off a directory yet remain discoverable, masked, and the like) at action 714. If the metadata is not compromised or removal is successful, then the methodology 700 can return to recording historical information at action 702.

Figure 8:
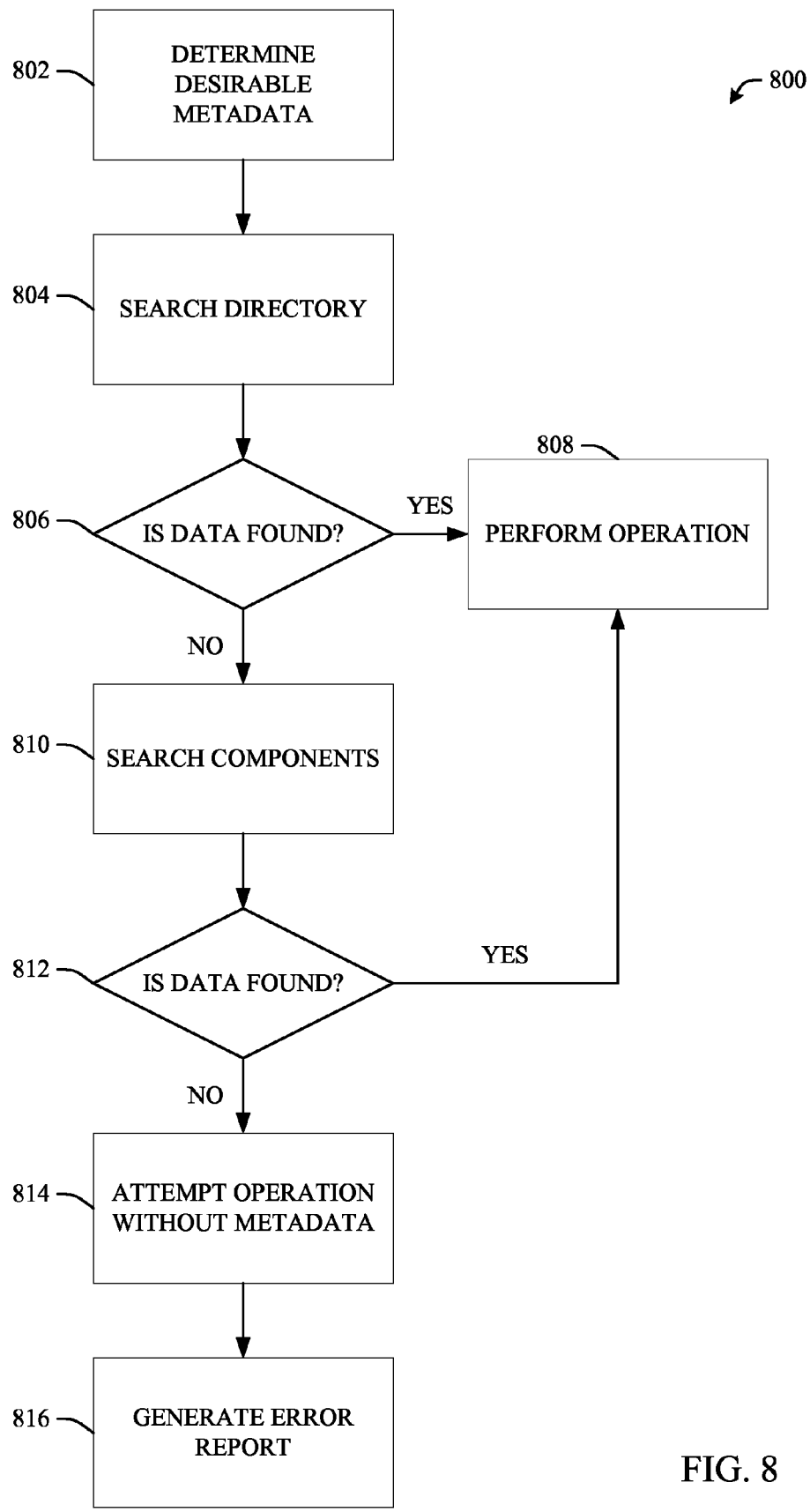
FIG. 8 illustrates a representative methodology for processing disclosed metadata in accordance with an aspect of the subject specification.

Now referring to FIG. 8, an example methodology 800 is disclosed for an entity that attempts to access disclosed metadata. An initial analysis can be performed to determine desirable metadata at event 802. For instance, an entity can attempt to run an operation and through the attempt and a system can learn that metadata becomes valuable. An entity attempting to construct a logical model of an industrial control system can desire to know relationships between controllers. A search can be performed on a directory of an industrial control system (e.g., a distributed directory) to locate information, either directly or through direction and/or an address provided by the directory through event 804.

A check 806 can be performed to determine if appropriate data is found. If the appropriate data is found, then the operation can be performed at action 808. An analysis can occur to determine if enough metadata is found; for instance, it can be difficult for a requesting entity to know if all relationships are disclosed through the directory, so a predictive model can be used. If enough metadata is not discovered, then individual components can be searched at 810. It is to be appreciated that searching the directory can be skipped and there can be direct searching of components.

Another check 812 can occur to determine if enough metadata is ascertained; if enough metadata is ascertained, then the methodology 800 can return to action 808 to perform the operation. If appropriate metadata is not found, then the operation can be attempted without the metadata at act 814. An error report can also be generated at action 816. The error report can detail that the operation failed or that desirable metadata is not obtained even if the operation is successful. The error report can be transferred to a central service, to a component that can modify operation, through an observer that recorded feedback from entities, and the like.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
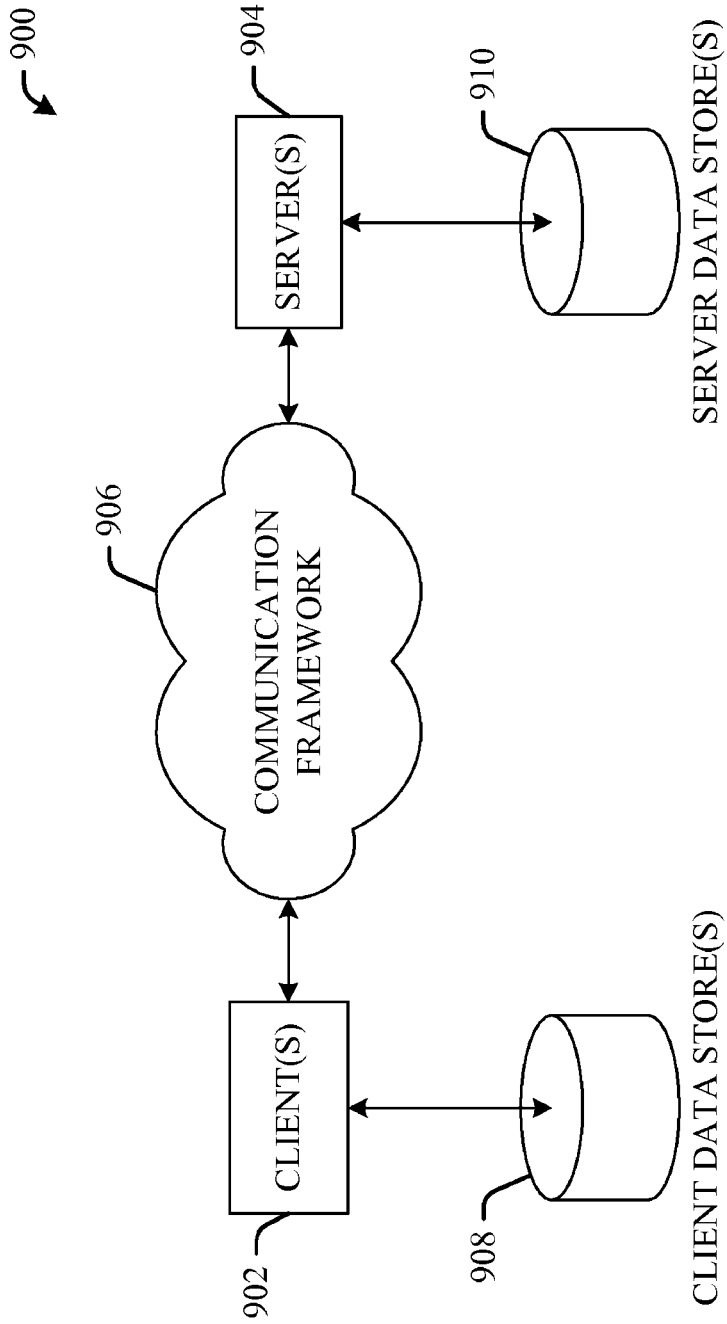
FIG. 9 illustrates an example of a schematic block diagram of a computing environment in accordance with an aspect subject specification.
Figure 10:
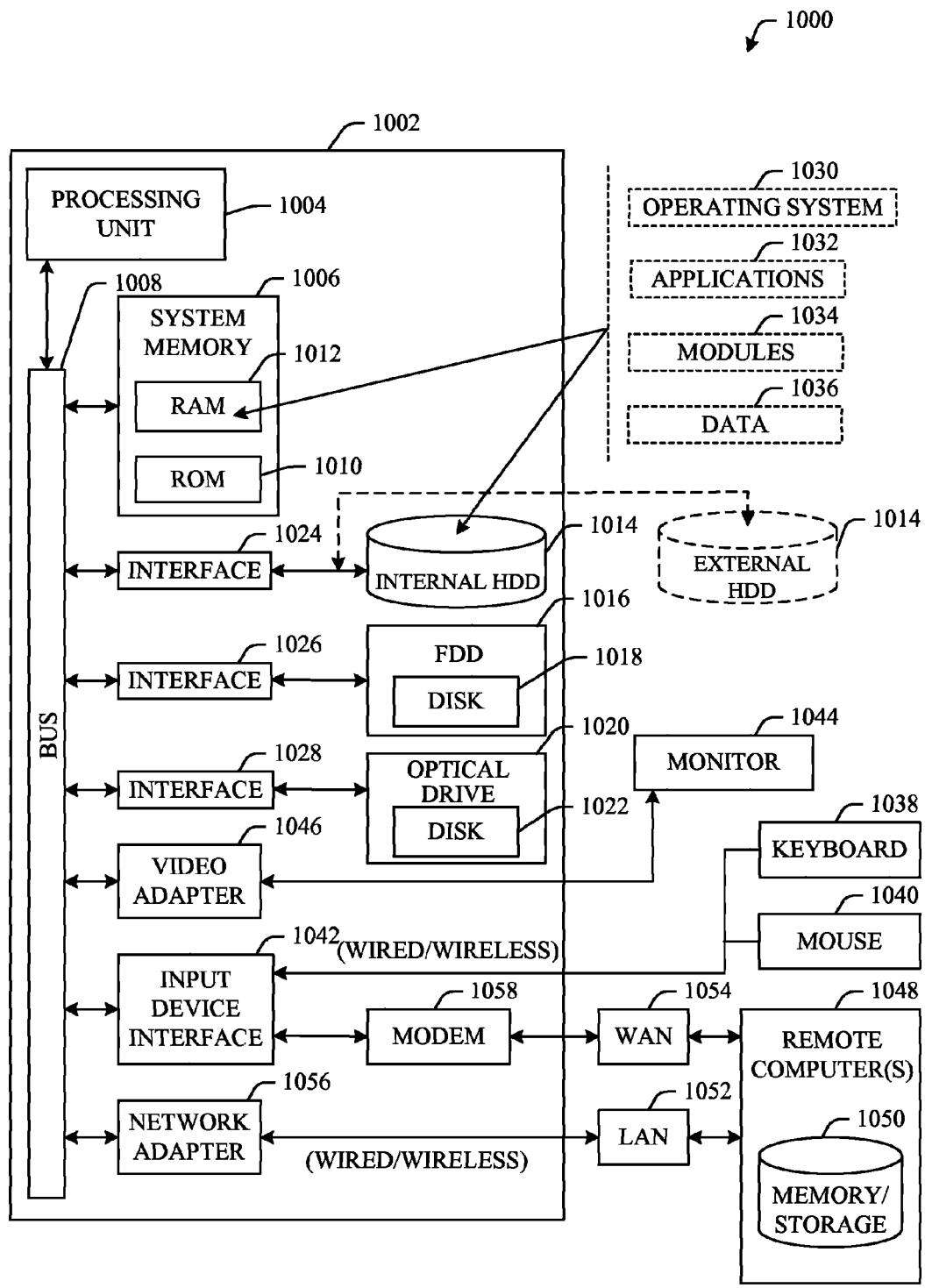
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial control system, comprising:
   a processor; and
   a memory communicatively coupled to the processor, the memory having stored therein computer executable components, comprising:
      an analysis component configured to:
         evaluate a risk associated with disclosing a subset of metadata to a first industrial control device in the industrial control system, wherein the metadata describes at least one operational capability of a second industrial control device implemented in the industrial control system;
         assign a security rating to the risk; and
         estimate, using an artificial intelligence algorithm, a value indicative of how valuable the subset of the metadata is to the first industrial control device based upon at least one criterion associated with the first industrial control device; and
      a selection component configured to:
         determine whether to disclose the subset of metadata to the first industrial control device based upon the security rating and the estimated value, and:
            in response to a determination that the subset of metadata should be disclosed to the first industrial control device, make the subset of metadata available to the first industrial control device, or
            in response to a determination that the subset of metadata should not be disclosed to the first industrial control device, prevent access to the subset of metadata by the first industrial control device.

2. The industrial control system of claim 1, wherein the metadata further describes at least one of a service provided by the second industrial control device, a relationship of the second industrial control device with an entity, or a dependency of the second industrial control device.

3. The industrial control system of claim 1, wherein the selection component is further configured to assign respective weights to the assigned security rating and the estimated value for the determination of whether to disclose the subset of metadata to the first industrial control device.

4. The industrial control system of claim 1, wherein the risk relates to at least one of a likelihood of the first industrial control device requesting the metadata, a security characteristic of the metadata, volatility of the metadata, a potential damage resulting from disclosing the subset of the metadata, or a likelihood of the subset of metadata being accessed by an undesirable entity.

5. The industrial control system of claim 1, wherein the selection component is further configured to:
   analyze historical information related to access of the metadata; and
   determine whether to disclose the subset of metadata to the first industrial control device based upon the security rating, the estimated value, and the analyzed historical information.

6. The industrial control system of claim 1, wherein the selection component is further configured to accept user input overriding a determination by the selection component on whether to disclose the subset of metadata to the first industrial control device.

7. The industrial control system of claim 1, wherein the selection component is further configured to, in response to determining to disclose the subset of the metadata, determine whether the subset of the metadata is to be published to a directory accessible by the first industrial control device or be discoverable by the first industrial control device.

8. The industrial control system of claim 1, wherein the at least one criterion comprises a failure rate of the other module resulting from metadata requests from the first industrial control device.

9. The industrial control system of claim 1, wherein the at least one criterion comprises a contextual characteristic associated with the first industrial control device.

10. A method, comprising:
    evaluating, by a device including a processor, a risk associated with exposing at least one portion of metadata to a first industrial control device installed in an industrial control system, wherein the metadata describes at least one operational capability of a second industrial control device implemented in the industrial control system;
    assigning, by the device, a security rating to the risk;
    estimating, by the device, using an artificial intelligence algorithm, a value indicative of how valuable the at least one portion of the metadata is to the first industrial control device based upon at least one criterion associated with the first industrial control device; and
    determining, by the device, whether to expose the at least one portion of metadata to the first industrial control device based upon the security rating and the estimated value, and:
       in response to determining that the subset of metadata should be disclosed to the first industrial control device, make the subset of metadata available to the first industrial control device, or
       in response to determining that the subset of metadata should not be disclosed to the first industrial control device, prevent access to the subset of metadata by the first industrial control device.

11. The method of claim 10, further comprising:
    analyzing historical information related to access of the metadata; and
    wherein the determining comprises determining whether to disclose the at least one portion of the metadata to the first industrial control device based upon the security rating, the estimated value, and the analyzed historical information.

12. The method of claim 10, further comprising, in response to determining to disclose the at least one portion of the metadata to the first industrial control device, determining whether the at least one portion of the metadata is to be published to a directory accessible by the first industrial control device or be discoverable by the first industrial control device.

13. The method of claim 10, wherein the at least one criterion comprises a component failure rate of the first industrial control device resulting from metadata requests from the first industrial control device.

14. A non-transitory computer-readable medium having instructions stored thereon that, in response to execution, cause at least one device including a processor to perform operations comprising:
   evaluating a risk associated with exposing at least one portion of the metadata to a first industrial control device installed in an industrial control system, wherein the metadata describes at least one operational capability of a second industrial control device in the industrial control system;
   assigning a security rating to the risk; and
   predicting, using an artificial intelligence algorithm, a value indicative of how valuable the at least one portion of the metadata is to the first industrial control device based upon at least one criterion associated with the first industrial control device; and
   determining whether to expose the at least one portion of metadata to the first industrial control device based upon the security rating and the predicted value, and:
      in response to determining that the subset of metadata should be disclosed to the first industrial control device, make the subset of metadata available to the first industrial control device, or
      in response to determining that the subset of metadata should not be disclosed to the first industrial control device, prevent access to the subset of metadata by the first industrial control device.

15. The non-transitory computer-readable medium of claim 14, further comprising:
   analyzing historical information related to access of the metadata; and
   wherein the determining comprises determining whether to disclose the at least one portion of the metadata to the first industrial control device based upon the security rating, the predicted value, and the analyzed historical information.

16. The non-transitory computer-readable medium of claim 14, the operations further comprising, in response to determining to disclose the at least one portion of the metadata to the first industrial control device, determining whether the at least one portion of the metadata is to be published to a directory accessible by the first industrial control device or be discoverable by the first industrial control device.

17. The non-transitory computer-readable medium of claim 16, the operations further comprising accepting user input overriding a determination by the selection component on whether to disclose the at least one portion of the metadata to the first industrial control device.

18. The non-transitory computer-readable medium of claim 14, wherein the at least one criterion comprises a failure rate of the first industrial control device resulting from metadata requests from the first industrial control device.

19. A system comprising:
   means for evaluating a risk associated with disclosing a subset of metadata to a first industrial control device installed in an industrial control system, wherein the metadata describes an operational capability of a second industrial control device in an industrial control system;
   means for associating a security rating to the risk;
   means for estimating, using an artificial intelligence algorithm, a value indicative of how valuable the subset of the metadata is to the first industrial control device based upon at least one criterion associated with the first industrial control device; and
   means for determining whether to disclose the subset of metadata to the first industrial control device based upon the security risk and the estimated value, and:
      in response to determining that the subset of metadata should be disclosed to the first industrial control device, make the subset of metadata available to the first industrial control device, or
      in response to determining that the subset of metadata should not be disclosed to the first industrial control device, prevent access to the subset of metadata by the first industrial control device.

20. The system of claim 19, wherein the at least one criterion comprises a component failure rate of the entity resulting from metadata requests from the first industrial control device.

* * * * *